(12) United States Patent
Saliba et al.

(10) Patent No.: US 8,332,616 B2
(45) Date of Patent: Dec. 11, 2012

(54) METHODS AND SYSTEMS FOR VECTORED DATA DE-DUPLICATION

(76) Inventors: George Saliba, Boulder, CO (US); Theron White, Boulder, CO (US)

(*) Notice: Subject to any disclaimer, the term of this patent is extended or adjusted under 35 U.S.C. 154(b) by 22 days.

(21) Appl. No.: 13/153,688

(22) Filed: Jun. 6, 2011

(65) Prior Publication Data

US 2011/0258398 A1    Oct. 20, 2011

Related U.S. Application Data

(63) Continuation of application No. 12/019,527, filed on Jan. 24, 2008, now Pat. No. 7,979,670.

(51) Int. Cl.
  *G06F 9/26*    (2006.01)
  *G06F 9/34*    (2006.01)
  *G06F 13/00*   (2006.01)
  *G06F 13/28*   (2006.01)
(52) U.S. Cl. .... 711/216; 711/202; 711/154; 711/E12.06
(58) Field of Classification Search .......... None
  See application file for complete search history.

(56) References Cited

U.S. PATENT DOCUMENTS

| | | | |
|---|---|---|---|
| 5,901,228 A | 5/1999 | Crawford | |
| 5,990,810 A * | 11/1999 | Williams | 341/51 |
| 2003/0149856 A1 | 8/2003 | Cernea | |
| 2005/0071436 A1 | 3/2005 | Hsu et al. | |
| 2009/0063795 A1 * | 3/2009 | Yueh | 711/162 |

OTHER PUBLICATIONS

Patent Cooperation Treaty (PCT) International Search Report from co-pending parent PCT Application No. PCT/US2009/031717 (International Filing Date Jan. 22, 2009) having a mailing date of Mar. 3, 2009 (3 pgs).

* cited by examiner

*Primary Examiner* — Kevin Verbrugge
*Assistant Examiner* — Eric S Cardwell

(57) ABSTRACT

The present invention is directed toward methods and systems for data de-duplication. More particularly, in various embodiments, the present invention provides systems and methods for data de-duplication that may utilize a vectoring method for data de-duplication wherein a stream of data is divided into "data sets" or blocks. For each block, a code, such as a hash or cyclic redundancy code may be calculated and stored. The first block of the set may be written normally and its address and hash can be stored and noted. Subsequent block hashes may be compared with previously written block hashes.

7 Claims, 10 Drawing Sheets

METHODS AND SYSTEMS FOR VECTORED DATA DE-DUPLICATION

CROSS REFERENCE OF RELATED APPLICATION

This is a continuation of application Ser. No. 12/019,527, filed on Jan. 24, 2008, now U.S. Pat. No. 7,979,670 entitled "METHODS AND SYSTEMS FOR VECTORED DATA DE-DUPLICATION," issued on Jul. $12^{th}$, 2011, and assigned to the present assignee.

FIELD OF THE INVENTION

The present invention relates generally to data processing systems and more particularly, some embodiments relate to methods and systems for performing data de-duplication.

BACKGROUND OF THE INVENTION

Vast amounts of electronic information are stored, communicated, and manipulated by modern computer systems. Much of this vast amount of electronic information is duplicated. For example, duplicate or near duplicate copies of data may be stored on a hard drive or hard drives, communicated across a communication channel, or processed using a computer or other electronic device. This duplicated data might be used in many different applications and on many different electronic systems. Accordingly, data de-duplication technology may impact a broad range of applications.

Data de-duplication is a method of reducing or eliminating redundant files, blocks of data, etc. In this way, a data de-duplication system attempts to ensure that only unique data is stored, transmitted, processed, etc. Data de-duplication is also sometimes referred to as capacity optimized protection. Additionally, data de-duplication may address rapidly growing capacity needs by reducing electronic information storage capacity required, transmission capacity, processor capacity, etc.

In one example of how duplicate data might exist on a computer network, an employee may email a Word® attachment to 25 co-workers. On some systems, a copy is saved for every employee the file was sent to, increasing the capacity requirement of the file by a factor of 25. In some cases data de-duplication technology may eliminate the redundant files, replacing them with "pointers" to the original data after it has been confirmed that all copies are identical. This example illustrates data de-duplication at the file level. Data de-duplication may also be implemented based on variable size blocks of data. In other words, redundant variable sized blocks of data may be eliminated by replacing these blocks with a pointer to another instance of a matching block of data.

In some cases, data duplication might occur in a data storage system. For example, archived electronic information such as electronic documents, files, programs, etc. exist on backup tapes, backup hard drives, and other media. In many cases a computer may store a large number files, which in some cases may be duplicates of the same file or document, slightly differing versions of the same document, etc. Accordingly, duplicates or near duplicates might exist for many different types of files, including documents, graphic files, and just about any other type of computer file.

Additionally, duplication might occur when data is communicated. In computer-based systems it is common for a computer to transmit one or more files over a computer network or other communication system to, for example, other computers in the computer network. This network may be wired, wireless, or some combination of the two. Additionally, the network may use just about any computer data communication system to transmit the data.

Different types of duplication might exist. In one type, a file or files may be repeatedly transmitted by a computer. For example, it is common for data transmitted during a backup operation to be almost identical to the data transmitted during the previous backup operation. Accordingly, a computer, computer networks, etc. might also repeatedly communicate the same or similar data.

In another type of duplication, a duplicate or near duplicate file or files, such as duplicate or near duplicate document, graphic files, etc. might be stored on a computer system. In other words, multiple copies of a file might exist, as in the emailed document example. Accordingly, different types of file de-duplication systems and methods might address various types of duplication. Some types of data de-duplication systems and methods might relate to file duplication or near duplication that involves multiple copies of the same or similar files sent during the same transmission. Other types of data de-duplication systems and methods may relate to file duplication that involves the same or similar files sent during a series of transmissions. Yet other types of data de-duplication might relate to both types of file duplication or near duplication.

Data de-duplication might include both transmission for backup and the backup itself. For example, some data de-duplication systems may transmit only data that has changed since a pervious backup. This data might be stored on a daily basis or perhaps a weekly basis. In some systems these changes in the data might be what is saved, for example, on a backup drive, disc, tape, etc. For example, a backup system might initially transmit a "full backup" for example, all files in a directory or series of directories, all files on a disc or on a computer, all files on all disks on an entire network, etc. The full backup might simply be any and all files that a particular user selects for backup. The data for the full backup may be transmitted and stored using various communication and storage systems. After the full backup, subsequent backups might be based on only files that have changed. These might be the only files subsequently transmitted, stored or both. Of course, a user might also select to do a full backup from time to time after the initial full backup.

Systems that only make full backups might be required to store a large amount of data. This may increase the expenses associated with these types of systems due to, for example, the cost of additional hard drives, tape media, data CD's or DVD's, wear on disc drives, CD or DVD drives, tape drives, etc. Accordingly, incremental systems might be more efficient in terms of data storage, mechanical wear on system components, etc.

In some cases, duplicate data might also be processed in other ways by a computer system, a network of computers, etc. For example, the systems and methods described herein might not only be applied to data storage devices, but to data transmission devices or any other data processing devices that deal with blocks of data that might be redundant. For example, in data mining and information filtering applications, duplicate or near duplicate files might be processed by the data mining or information filtering applications. In another example, an enterprise software applications might receive data from a wide variety of sources. These sources might vary widely in terms of formatting, quality control, or other factors that may impact the consistency or reliability of the data. As a result, the database may contain duplicative or erroneous data. In many cases this data may need to be "cleaned."

"Data cleaning," or "data clean-up," generally refers to the handling of missing data or identifying data integrity violations. "Dirty data" generally refers to input data records or to particular data fields in a string of data comprising a full data record. For example, as discussed above, anomalies may exist because data might not conform in terms of content, format, or some other standard established for the database. This dirty data many need to be analyzed.

One example where dirty data may need to be analyzed involves credit card transactions processing. Transactions may contain electronic information that includes data in predetermined fields. These predetermined fields might contain specific information, such as, for example, transaction amount, credit card number, identification information, merchant information, date, time, etc. Various types of data errors may be introduced in each of the millions of credit card transactions are recorded each day. For example, the merchant identifying data field for a transaction record might be tainted with information specific to the individual transaction. As an example, consider a data set of transactions where the merchant name field indicates the merchant name and additional merchant information. This information might be added by the merchants and may include a store number or other merchant specific information that might not be needed by the clearinghouse to authorize or settle the transaction. In some cases it might be important to clean this data to conform to a format that specifies the merchant name without any of the additional information. In other cases, data storage space might be saved by using one of various data de-duplication systems and methods. For example, a name used in many transactions might be saved in one data storage location and a pointer might be saved in other data storage locations.

There are two main types of de-duplication. These methods are inline or offline. Inline de-duplication is performed by a device in the data path. This may reduce the disk capacity required to store electronic data thereby increasing cost savings. A disadvantage of inline de-duplication is that the data is processed while it is being transmitted for backup, which may slow down the backup process.

In contrast, offline data de-duplication does not perform the data de-duplication in the data path, but instead performs the process at the backup system. This may require more data storage capacity, such as, for example, disk capacity. Performance may, however, be improved by having the process reside outside of the data path, after the backup job is complete. In other words, because the data is processed after being transmitted for backup it generally will not slow the transmission of data down.

In some systems, data de-duplication technology uses a dictionary based hashing to eliminate redundant sets of variable size blocks within the data stream. The dictionary lookup method is very effective in reducing the data, however, this approach requires extensive processing power and fast storage devices to reduce the data. This can mean that many dictionary based de-duplication approaches are not suitable for tape backup and may require high disk bandwidth in the Virtual Tape Library systems. Accordingly, in some cases it may be advantageous to use de-duplication technology that does not use dictionary based de-duplication approaches.

BRIEF SUMMARY OF THE INVENTION

The present invention is directed toward methods and systems for data de-duplication. More particularly, in various embodiments, the present invention provides systems and methods for data de-duplication that may utilize a vectoring method for data de-duplication wherein a stream of data is divided into data sets or blocks. For each block, hashes, Cyclic Redundancy Codes ("CRCs") or any other code that might represent a block may be calculated and stored. In some embodiments, one or more codes may be stored at the end of the blocks. The first block of the set may be written normally and its address and hash can be stored and noted. Subsequent block hashes may be compared with previously written block hashes.

In accordance with some embodiments, blocks that do not match previous hashes can be written in the normal manner. Blocks with hashes that match previously written blocks may be treated in a special manner where only the vector address (back-link) is written to indicate the location of the "parent block." (The previously written block with the matching eRe or hash.) This process may eliminate redundant data. In some cases the systems and methods described herein may perform data de-duplication without the need for the large and complex directory searches.

In various embodiments, for added data integrity and performance, back-link and span can be set and special markers as often used in tape drive for "defect skip" are written into the storage medium to indicate the absence of de-duped block locations. The systems and methods described herein may be used for disk, Virtual Tape Libraries, tapes whereby the vectored data is self describing, or other data storage devices.

In some embodiments, the stream of data may be divided into data blocks that contain user data. The blocks may be of fixed size and may be set according to some predetermined rules. These rules might vary from implementation to implementation. Various embodiments might use a hash match that is effective to increase the probability of data match. In another embodiment might use a sliding window to optimize the hash matches.

In some embodiments, once the data is divided into blocks, the hashing or eRe may be calculated and stored at the end of each block. For example, in a tape drive based system. In some embodiments large eRC's might be selected to protect against "collisions." Collisions are caused when a block has a matching CRC even though the underlying data does not match. The larger the CRC the lower the probability of a collision.

In some embodiments, when the hash or CRC match, the block hash or CRC may be used as token for subsequent matches. In other embodiments, for example, embodiments with shorter CRCs blocks with matching CRCs may be compared to verify that the blocks do indeed match.

Blocks that do not have previously matched hashes or CRCs may be written normally, for example, like current tape drive formats. For blocks with CRC that match previously written blocks, only the "back-link" is written. The back-link may vector to any location using multiple blocks or block spans. The basic format of the systems and methods described herein may be adapted to accommodate various disk formats, tape formats, and just about any other digital storage device format. Example tape formats can include Digital Linear Tape ("DLT"), Super Digital Linear Tape ("SDLT") drive have varying number of heads and logical tracks including entity scrambling.

BRIEF DESCRIPTION OF THE DRAWINGS

The present invention, in accordance with one or more embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Figure 1:
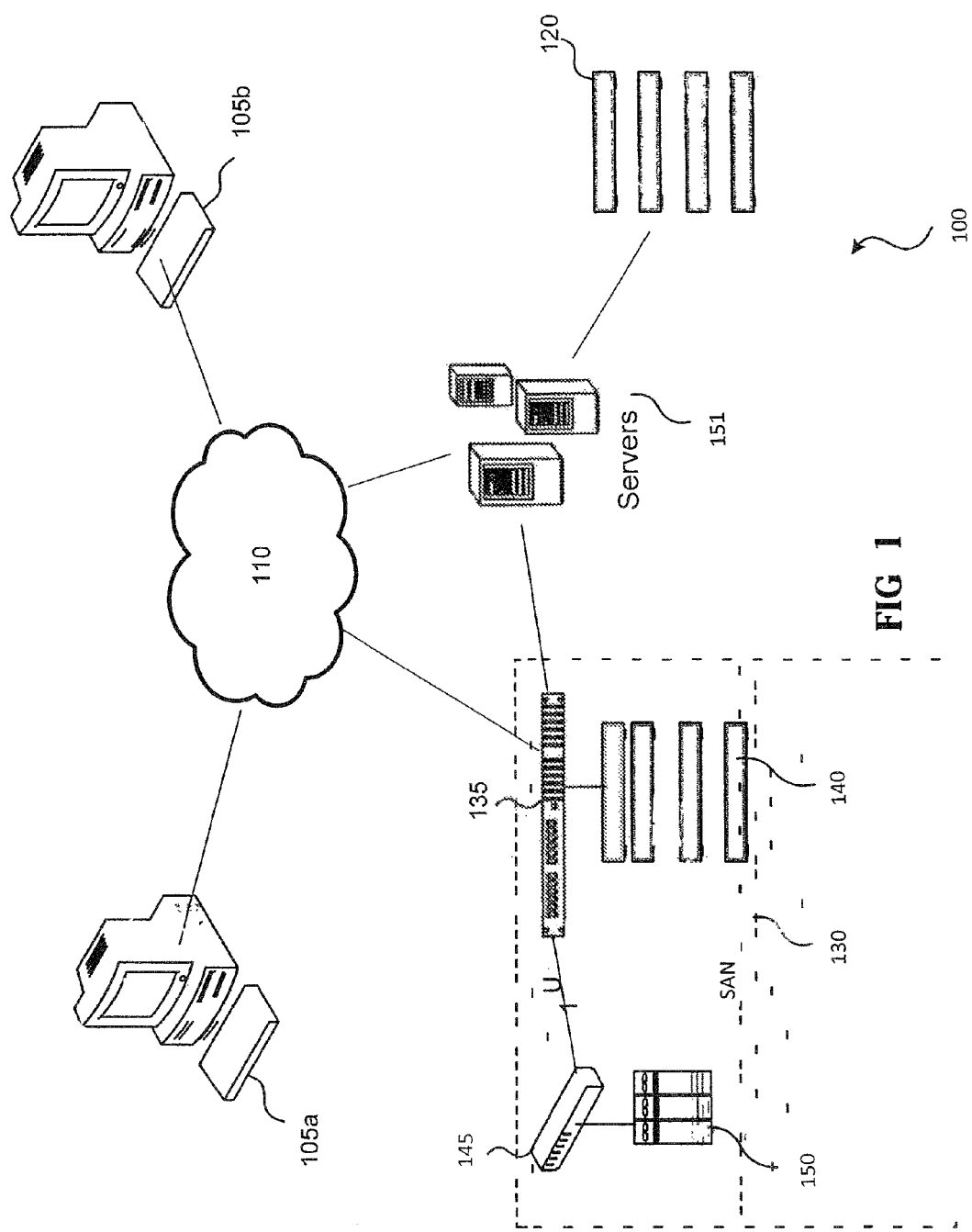
FIG. 1 is a block diagram illustrating one possible configuration of a network that can serve as an example environment in which the present invention can be implemented.

The figures are not intended to be exhaustive or to limit the invention to the precise form disclosed. It should be understood that the invention can be practiced with modification and alteration, and that the invention be limited only by the claims and the equivalents thereof.

DESCRIPTION OF THE PREFERRED EMBODIMENTS

Various embodiments of the systems and methods described herein provides data de-duplication that may utilize a vectoring method for data de-duplication. In this vectoring method for data de-duplication, a stream of data may be divided into pieces, data blocks or chunks of data. In various embodiments, these pieces, blocks, or chunks may be the same size. In some embodiments, the block size might be selected such that the pieces, data blocks or chunks are the same size as a block on the storage media used to store the data. By selecting a block size that is the same as the block size on the media each block will fit in the block without left over space. Additionally, in some embodiments, these blocks may store a vector that points to another equal sized block.

In some embodiments, a block size that does not match the size of a block on a data storage device may be used. For example, in some embodiments, a logical block might be used. The logical blocks might be made up of virtual blocks stored on a storage device. In such embodiments, a block might start or end anywhere in a data storage device block. Additionally, in some embodiments, this may be done using an offset. For example, an address might include a block number and a block offset. The block number might be based on a data storage device block or a virtual block. The offset may indicate where within these blocks the start or end of a stored block occurs.

For each block, hashes, Cyclic Redundancy Codes ("CRCs") or any other code that might represent a block may be calculated and stored. In some embodiments, one or more hashes, CRCs, or other codes may be stored at the end of the blocks. A hash or hash function is a reproducible method to turning one block of data into a number that represents that block of data. The hash is generally smaller than the original block of data and might serve as a digital "fingerprint" of the block of data. A CRC is a type of hash function that may be used to produce a checksum to detect errors in transmission or storage.

The first block of the set may be written normally and its address and hash can be stored and noted. Subsequent block hashes may be compared with previously written block hashes. The vector address of a block with a hash or CRC that matches a previously written block may be written to indicate the location of the previously written block. In this way, redundant data may be eliminated.

In some embodiments a vector may be a pointer, an address, or other information that indicate where data may be found. For example, a vector may be a set of numbers. These numbers may be relative to a specific block or the number may be relative to the block where the vector is stored. For example, each block might be assigned a number. The numbers might be ordinal numbers, such as 1, 2, 3, 4, 5, etc. A vector might be stored in block 5. In one example, the vector stored in block 5 might point to block 2. Some embodiments might indicate this by storing the block number "2". Other embodiments might use a vector that is relative to block 5. For example, "3" might be stored because 5−3=2. Various other vector addressing schemes might be used, as will be appreciated by those of skill in the art.

In various embodiments, a vector might include a capsule number, a vessel number, a block number and an offset. A vessel is a set of capsules. It may be an entire storage device, part of a storage device or parts of multiple storage devices. A capsule is a set of physical data blocks. In some cases a capsule with an error correcting code may be referred to as an entity. In these embodiments a vessel might also include the error correcting codes for the capsules it contains. In some embodiments, a block number may indicate the physical block, logical block, or block on a data storage device where data begins. In various embodiments, the data may be offset within the block. Accordingly, an offset might be used to indicate where data begins in a block. Blocks and offsets might be used to store the start of data, the end of data, or other locations within a record or other data entity.

A record may be a logical block that can start in any physical block and end in any physical block. In other words, records may vary in size, with one record larger than another. These records, sometimes referred to as logical blocks may span several physical blocks. In some embodiments a physical block may be addressed using a start block and an offset. In this way the physical block might start in any part of a block on the actual data storage device.

Before describing the invention in detail, it is useful to describe an example environment with which the invention can be implemented. FIG. 1 is a block diagram illustrating one possible configuration of a network that can serve as an example environment in which the present invention can be implemented. The network might be wired or wireless. FIG. 1 illustrates a data storage system 100 with which the present invention can be implemented. System 100 in the illustrated example includes computing devices 105*a-b*, a network 110, a server 115, an array of storage disks 120, and a storage area network 130. Computing devices 105*a-b* can any of a variety of computing devices including, for example, laptops, desktops, workstations, personal digital assistants (PDAs), handheld computing devices, or other types of computing devices.

Network 110 can be implemented using any of a variety of network architectures or topologies. Such networks might include, for example, the internet, a local area network (LAN), a wide area network (WAN), a plain old telephone system (POTS), or any other suitable network or communications channel. In the illustrated example, computing devices 105*a-b* and server 115 are connected to network 110. The connection to network 110 can be wireless or through a wired connection.

Server 115 can be any server system such as, for example, a conventional standalone file server configured to provide data services to a client device such as device 105*a*. Server 115 can be scalable to increase storage capacity such as, for example, by adding storage disk array 120. Disk array 120 can be implemented as, for example, a direct-attached storage (DAS system). In the example architecture illustrated in FIG. 1, system 100 includes a storage pool 130, which includes switch 135, disk array 140, router 145, and a tape server 150. Server 115, disk array 120, and storage pool 130 can be implemented using one or more types of storage architectures such as, for example, small computer system interface (SCSI), serial advanced technology attachment (SATA), serial attached SCSI (SAS), or fiber channel (FC).

Generally, a legacy SCSI system with an 8-bit wide bus can typically deliver data at a rate of approximately 40 megabytes per second (ttMBpstt), whereas contemporary 16-bit wide bus SCSI systems can deliver data up to 320 MBps. Typical SAT A systems are generally less expensive than an equivalent SCSI system and can provide performance close to that of the 16-bit wide bus SCSI system at 300 MBps.

FC systems offer several advantages such as pooled resources, flexible backup capability, scalability, fast data transfer (up to 800 MBps full-duplex 4 Gbit link), and the ability to accommodate long cable lengths. FC systems may have cable lengths up to 10 kilometers as compared to a maximum cable length of 25 meters for other system such as, for example, a SCSI system.

With continued reference to FIG. 1, the illustrated exemplary system 100 can provide data access and storage redundancy by storing data at multiple locations such as server 115, disk arrays 120 and 140, or tape server 150. Server 115 can be groups of remote servers; each group may be locally or remotely connected with other groups via a network similar to network 110. As shown in FIG. 1, server 115 may access data or backup data to disk array 140 or tape server 150 through network 110 or via a direct connection to switch 135. In this way, server 115 has the flexibility of accessing array 140 or tape server 150 via multiple connections and thereby avoids network bottlenecks.

In various embodiments, switch 135 is an FC data switch and tape server 150 is SCSI type server. In this embodiment, router 145 is configured to transfer data between a FC data bus of FC switch 135 and a SCSI bus of SCSI tape server 150. Although a specific architecture is described above, components of storage pool 130 may have a different architecture or combination of architectures such as, for example, SAT A, SAS, and FC.

In system 100, data redundancy can be implemented in storage pool 130 by implementing RAID across disk array 140. Parity data needed for reconstructing a failed data sector can be distributed by a RAID controller (not shown) located in storage pool 130, across array 140, or separately to tape server 150, or across both array 140 and tape server 150. In this setup, clients 105*a-b* typically cannot access data stored within storage pool 130 network when a critical component (e.g., motherboard, switch 135, power supply, etc.) of node 130 fails.

From time to time, the present invention is described herein in terms of this example environment. Description in terms of this environment is provided to allow the various features and embodiments of the invention to be portrayed in the context of an exemplary application. After reading this description, it will become apparent to one of ordinary skill in the art how the invention can be implemented in different and alternative environments.

Figure 2:
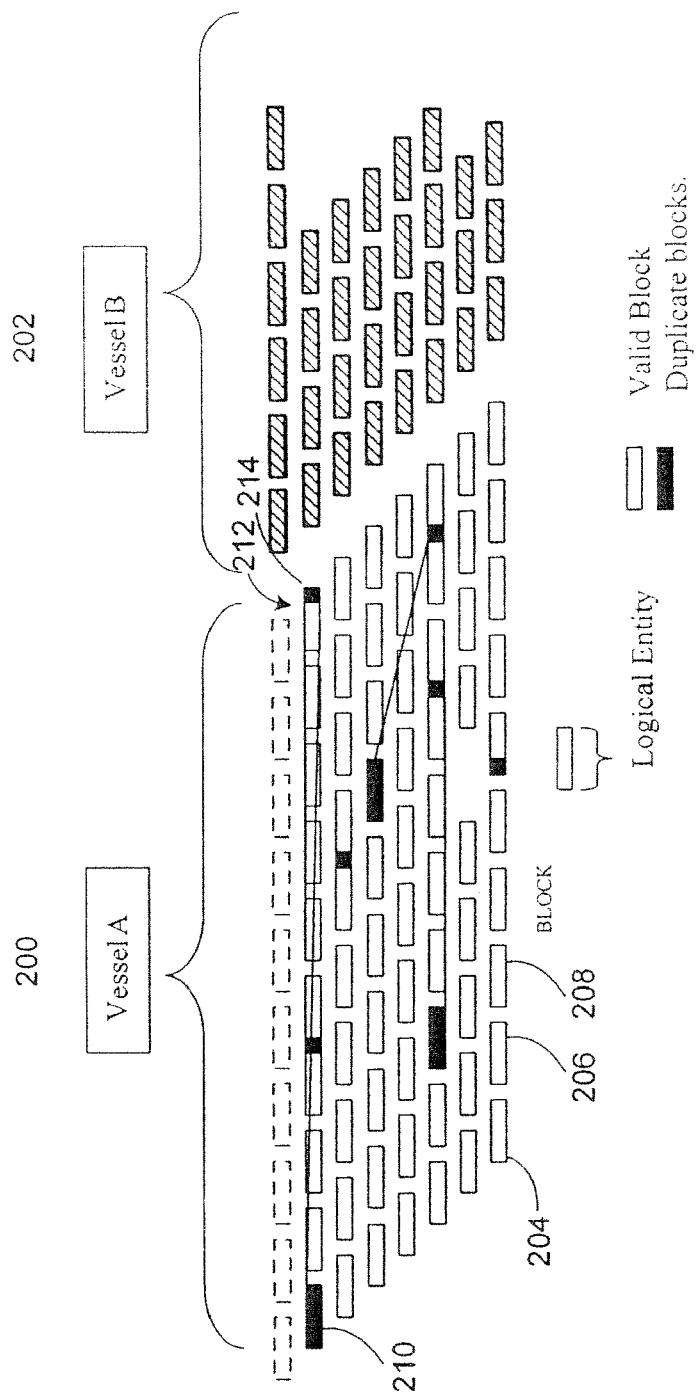
FIG. 2 is a diagram illustrating an example vector de-duplication format in accordance with various embodiments of the systems and methods described herein.

FIG. 2 is a diagram illustrating an example vector de-duplication format in accordance with various embodiments of the systems and methods described herein is discussed. Referring now to FIG. 2, a diagram including a first vessel 200 and a second vessel 202 are illustrated. Vessels 200 and 202 may include some number of valid blocks, 204, 206, and 208. Some of the blocks might be duplicate blocks 210 and 212. Note that 210 might indicate a first instance of a duplicate block. This first instance of a duplicate block 210 may occur two or more times in the rest of the data. For example, in FIG. 2, a duplicate block occurs at location 212. At location 212, rather than repeat duplicate block 210, a vector 214 may be written to indicate where to locate the data for the duplicate block 212. For example, the vector would reference the location of duplicate block 210. In this way the amount of storage space needed to store various data might be reduced because the vector is smaller than the block.

In various embodiments larger files might be stored as smaller, fixed blocks of information. Each of these might be addressable. Additionally, because a larger file might not be made up of an integer number of smaller fixed blocks, in some embodiments one or more blocks may be padded with additional bits. For example, the last block might be padded with O's, 1 IS, alternating O's and 1 IS, etc. A trade-off exists between block size and probability quantity of padding bits. Larger blocks are likely to require more padding bits, while smaller blocks may require a larger number of vectors if many of the blocks match. Additionally, larger blocks may be less likely to match. Accordingly, less memory might be saved. Smaller blocks may be more likely to match, which might allow for more storage savings.

The larger the block size, the more data storage space that might be saved when a back-link is stored in place of the block. In some cases, however, the larger the block size, the lower the probability of a match in the data and, accordingly, the lower the probability that an address may be stored in place of a block of data. Additionally, the block size should be selected such that it contains a larger number of bits than the number of bits in an address. If the address is as big or bigger (contains more bits) than the block size, no data storage space will be saved because just as many or more bits will be used to store the address.

In some embodiments, special markers may also be written into the storage medium to indicate the absence of de-duplicated block locations. The systems and methods described herein may be used for disk, Virtual Tape Libraries, tapes whereby the vectored data is self describing, or other data storage devices.

In some embodiments, the stream of data may be divided into data sets or "blocks" that contain user data. In various embodiments, the blocks may be fixed may be set according to some predetermined set of rules. Embodiments that use a fixed block size may address the blocks using, for example, a block count. This block count may be based on physical or virtual blocks. These rules might vary from implementation to implementation. Various embodiments might use a hash match that is effective to increase the probability of data match. Another embodiment might use a sliding window to optimize the hash matches.

In various embodiments, once the data is divided into blocks, the hashing or CRC may be calculated and stored at the end of each block. For example, a tape drive based system might use such a system. In some embodiments, large CRC's might be selected to protect against "collisions." Collisions are caused when a block has a matching CRC even though the underlying data does not match. Generally, the larger the CRC the lower the probability of a collision. In various embodiments, the probability of a collision may be 1I2n, where n is the number of bits in the CRC.

In some embodiments, when the hash or CRC match, the block hash or CRC may be used as a token for subsequent matches. In other embodiments, for example, embodiments with shorter CRCs, blocks with matching CRCs may be compared to verify that the blocks do indeed match. Blocks that do not have previously matched hashes or CRCs may be written normally, for example, like current tape drive formats.

In some embodiments, for blocks with a CRC that matches previously written blocks, only the back-link is written. In this way, each block may be addressable. Various embodiments may address blocks using, for example, a block count. In addition to a block count, an offset might also be used. This may allow blocks to be stored anywhere across a block on the storage device. For example, a block might start in the middle of such a block and might also cross block boundaries. By using an address in place of an actual eRe some processing might be eliminated. For example, fewer processing and comparisons steps might be necessary because the system might go to the address saved to get the data rather than use the eRe to look up having to look the eRe up in a "dictionary" in order to determine the address of the block associated with the eRe.

The back-link may be a vector address to any location using multiple blocks or block spans. The basic format of the systems and methods described herein may be adapted to accommodate various disk formats, tape formats, and just about any other digital storage device format. Example tape formats can include Digital Linear Tape ("DL T"), Super Digital Linear Tape ("SDLT") drive have varying number of heads and logical tracks including entity scrambling.

In some embodiments, a counter might be used to generate addresses. For example, a counter might count each block that is processed as part of a data stream. The counter value for each block might then be used as the physical address of each block. In place of blocks that are not stored, an address, for example, a prior counter value might be used. Accordingly, a series of logical addresses might be generated.

For example, a series of blocks might be received. Using a counter, these blocks might be assigned addresses such as, for example, 0, 1, 2, 3, 4, and 5. If blocks 1, 3, and 5 match, then the values stored might be value(block 0), value(block 1), value(block 2), vector(block 1), value(block 4), vector(block 1). In this way, the spaced used to store blocks 3 and 5 might be reduced, such as, for example, when the vector to a block uses fewer bits when compared to the block size.

In some embodiments, some number of redundant blocks might be stored. By storing redundant blocks of data, the data might be accessed even if a storage device fails in some way. For example, assume that blocks 0-5 are stored on a backup tape. Also assume that the data in blocks 1, 3, and 5 match, as discussed above, and the data values stored on the backup tape are value(block 0), value(block 1), value(block 2), value(block 3), value(block 4), vector(block 1 or block 3). In other words, values are stored in blocks 0, 1, 2, 3, and 4 and a pair of vectors are stored in block 5. The vectors point to the blocks 1 and 3. As will be understood by those of skill in the art, the data stored in blocks 1 and 3 are redundant because the data of blocks 1 and 3 match.

Assume that the data stored in block 1 is damaged. For example, the tape might have a defect at the location on the magnetic medium where block 1 is stored. This defect might make it impossible to read the data or the data might be corrupt such that the data that is read is incorrect. Data values for block 3 might be stored on the same tape. This block might not be damaged and may be read.

The data from block 3 is redundant with the data that was originally stored in block 1. When block 5 is read it may contain vectors to blocks 1 and 3. Accordingly, based on the vectors to blocks 1 and 3 it may be determined because blocks 1, 3, and 5 contain the same data values. From the data value of block 3, the undamaged data block, the value of blocks 1, 3, and 5

It will be understood that, in some examples, a block might be damaged, but readable. For example, it might have incorrect data. In some embodiments, it may be possible to flag the data as possibly incorrect. It may not be possible, in some embodiments, to determine which of, for example, two blocks is correct. In other embodiments, an odd number of repetitive blocks might be stored, if the data contains, for example, at least three of a given block. If two blocks match and one does not, the matching two blocks may be assumed correct. In this way incorrect data might be corrected.

In some embodiments, when a vector is used instead of an entire block, it may be possible to save other data in the rest of the block. For example, a subsequent block might be started right after the vector, rather than at the end of the unwritten block. In this way the data storage space needed to store a given file or files might be decreased.

In some embodiments, using a counter value to store data may replace using a "dictionary" lookup based on eRe or hash function. For example, in a set of blocks that do not include any redundant blocks the series of blocks may be read in order to retrieve the stored data. Similarly, in an example where a set of blocks include some redundancy a series of blocks or addresses may be read. The addresses may be used to determine the data of the redundant blocks. In systems that use a eRe or hash, the data might need to be looked up based on the eRe or hash, rather than addressed directly. This may require an additional step.

In various embodiments, data may be broken into logical blocks. These blocks may be the same size as the blocks on a storage device. For example, the storage space on a disk drive might be broken into a series of blocks. The blocks might be the same size as the logical blocks used to store a stream of data. In such a case the logical blocks might be stored using the device's address for that block. For example, each logical block might start at the beginning of a block on a device and may fill the entire block on the device. In other embodiments, however, an offset might be used. By using an offset, blocks might cross block boundaries. This may be used when device's block size matches logical block size. Generally, however, when the device's block size and the logical block size match, blocks may be stored using an entire device block, rather than crossing block boundaries on the device.

In some embodiments, the device's blocks size and the logical block size may not be the same. In such embodiments, the logical blocks might be stored using a device block address and an offset. By using an offset, as discussed above, a block might be stored starting in a location other than the beginning of a device's block. In this way "virtual blocks" may be addressable on top of the blocks of the device used to store data. In other words, blocks that are not the same size as the blocks on a storage device may be used to store data. By using a block number and an offset the beginning of a block may be addressed such that the block does not have to begin at the start of a block.

In some embodiments, a capsule may be used to store data. A capsule may be a collection of physical blocks. For example, a capsule may contain all physical blocks of a storage device, such as a disk drive, tape drive, or other storage device.

In various embodiments, a vessel may include a number of physical blocks that are the same size. A storage system may include multiple vessels. These vessels may have different physical block sizes. For example, some systems may include different storage devices, such as disk drives, tape drives, etc. These devices may have different block sizes. For example, the disk drive might have a different block size from the tape drive. It will be apparent to those of skill in the art, however, that different disk drives may have different block sizes from each other, different tape drives may have different block sizes from each other and various other data storage devices may have different block sizes from each other.

In an embodiment that includes multiple vessels, a block may be addressed by vessel number, physical block number and offset. In this way, each vessel in a system may be addressed and each block within the vessels may be addressed. Additionally, by using an offset, data may not be required to begin and end at a physical block boundary. In some embodiments, padding might also be used to fill a block.

Figure 3:
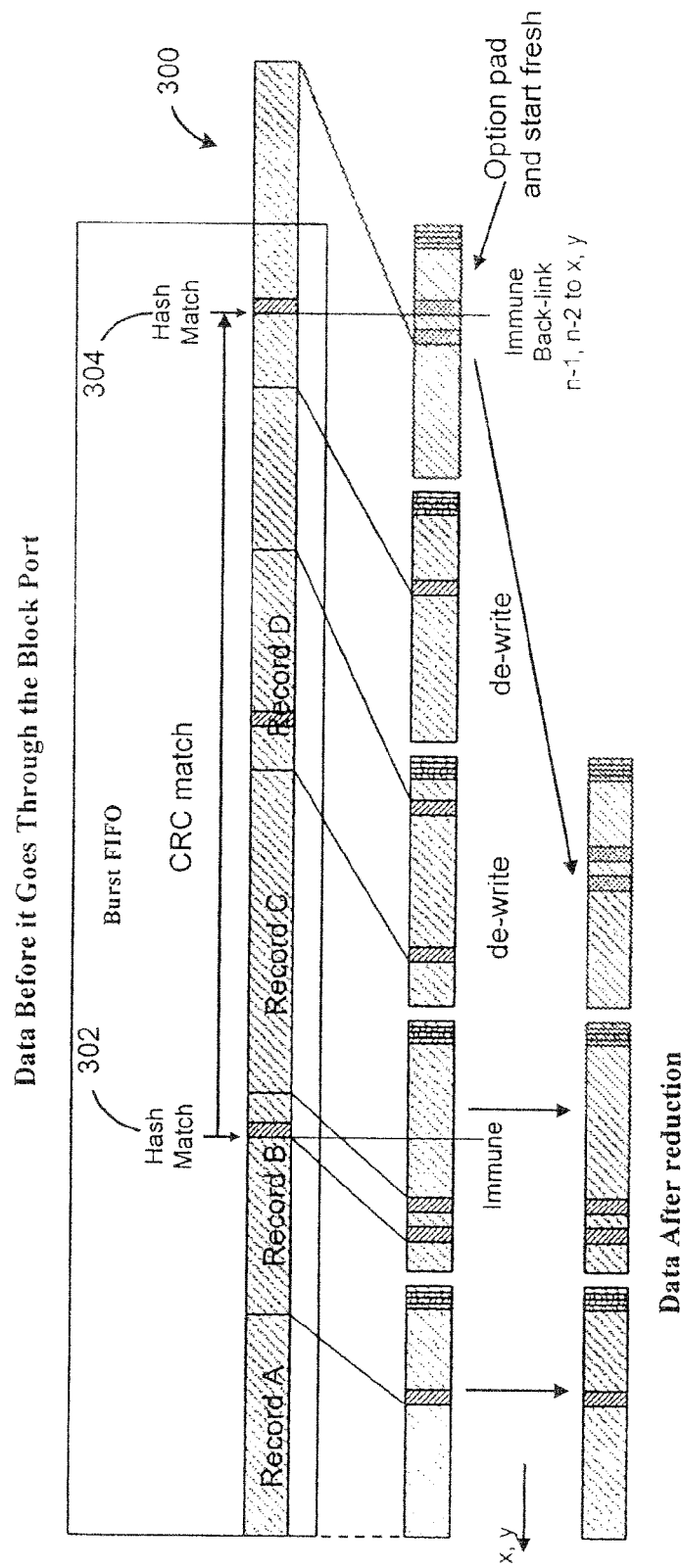
FIG. 3 is a diagram illustrating an example block "un-write" processing in accordance with various embodiments of the systems and methods described herein.

FIG. 3 is a diagram illustrating an example block "un-write" processing in accordance with various embodiments of the systems and methods described herein. Referring now to FIG. 3, a series of records 300 are illustrated. A record may occupy, for example, one or more blocks of data. In various embodiments, a block may be the smallest readable or writable unit of data on the storage medium. In various embodiments approximately 12 kilobytes is used for each block, however, it will be understood that other block sizes are possible.

The records 300 may include matching records 302 and 304. For example, in various embodiments the matching records 302 and 304 may be indicated by matching hashes, a CRC match, etc.

It will be understood by those of skill in the art that different CRCs or hashes may have a higher probability of indicating a matching record. In some embodiments, for example, CRCs made up of a large number of bits might be used. Using a large number of bits may lower the probability of an incorrect match as compared to fewer bits because generally, as the number of bits increases, it becomes less likely that a block of bits with different data will generate the same CRe. For example, a CRC with 10 bits will have 210 different possible eRC values.

In some embodiments matches might be verified. For example, when a CRC match occurs, the "matching" blocks might be compared bit-by-bit, byte-by-byte, word-by-word, etc. in order to determine that an actual match has occurred. Alternatively, in another embodiment, another CRC might be calculated. For example, when a match occurs new CRCs might be calculated for the "matching" blocks. The new CRCs might use more bits. In this way the probability of a collision may be decreased. In another embodiment, the CRCs might be calculated in a different way, such that getting a match for two different blocks for both methods of calculating the CRC is extremely low, or in some cases, not possible. In some embodiments, this second check might use fewer bits because it is only intended to double check a previous matching CRC between the two blocks. In some embodiments, one or more of the methods discussed above might also be combined to find matching blocks. In various embodiments a span CRC might be based on a narrow hash match, while a block CRC might be based on the size of a compressed record.

Figure 4:
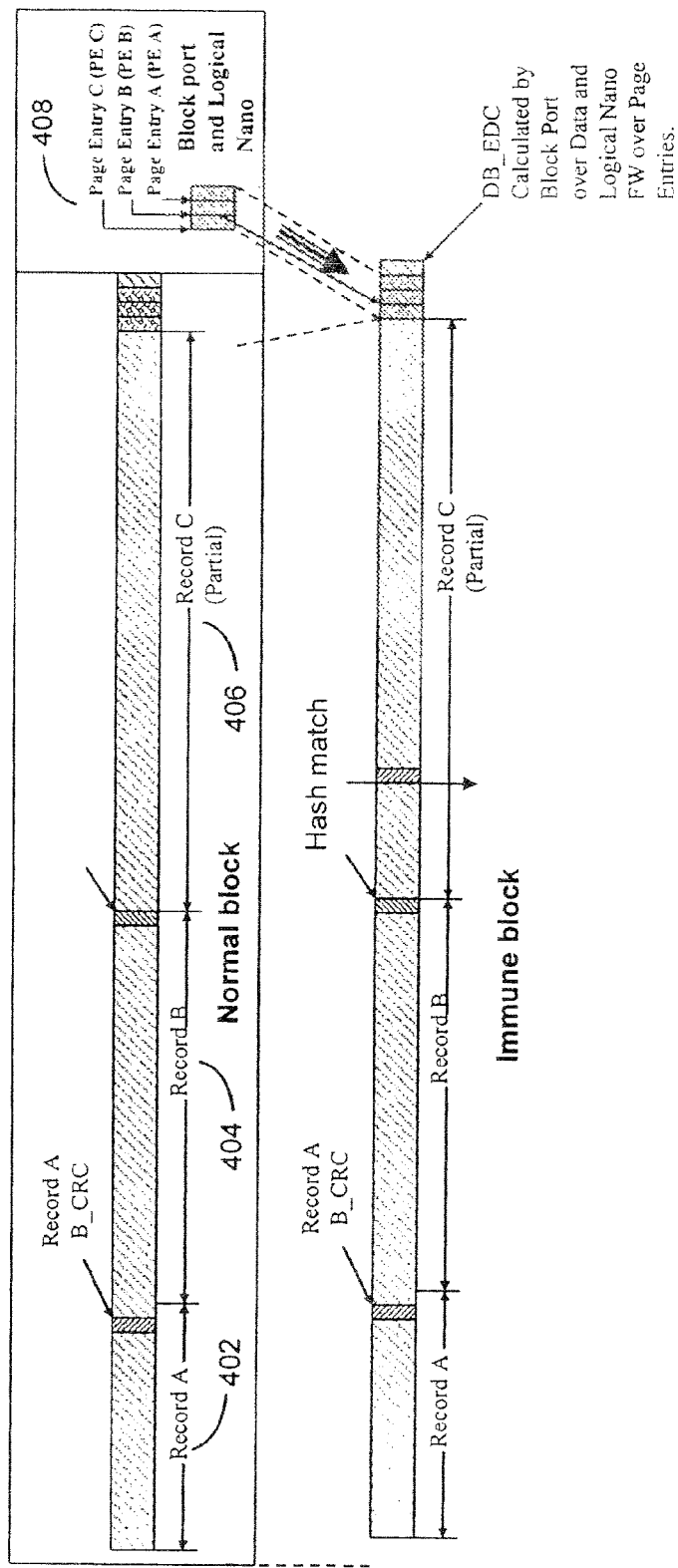
FIG. 4 is a diagram illustrating an example of block port processing in accordance with various embodiments of the systems and methods described herein.

FIG. 4 is a diagram illustrating an example of block port processing in accordance with various embodiments of the systems and methods described herein. Referring now to FIG. 4, a normal block may include 1 or more pages, each representing a record or partial record contained within the block. FIG. 4 illustrates a block containing 3 pages representing complete records A 402 and B 404, and a partial record C 406 which begins in the block shown but ends in a subsequent block. Pages representing partial records exist because block size and record size might be such that a record spans two or more blocks. The block might also contain a table of page entries 408 describing each page of the block. FIG. 4 illustrates page entry table 408 stored in the block following series of record pages 402, 404, and 406.

Figure 5:
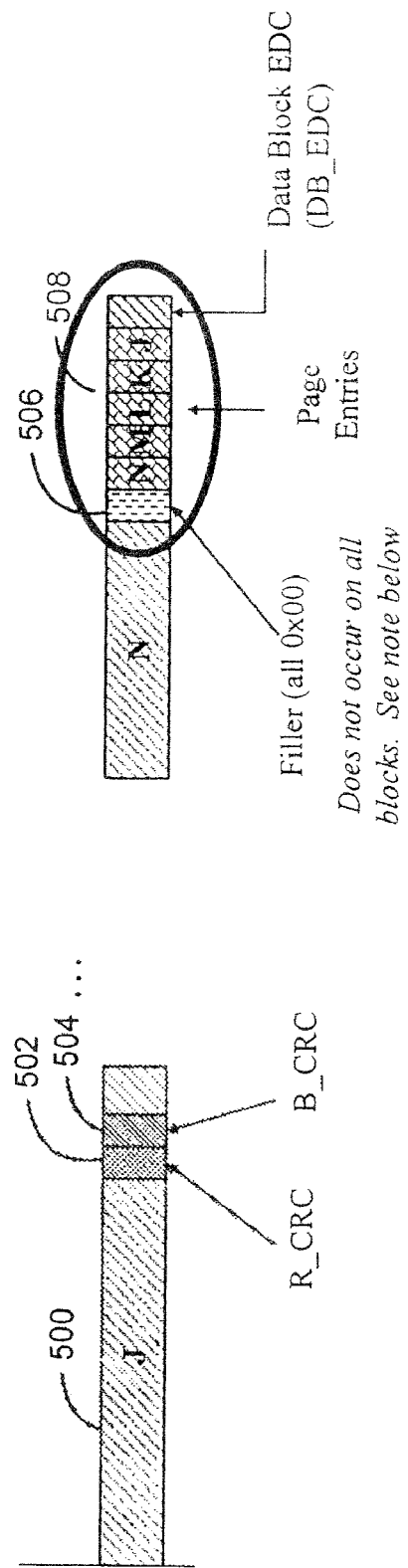
FIG. 5 is a diagram illustrating an example page entry in accordance with various embodiments of the systems and methods described herein.

FIG. 5 is a diagram illustrating an example page entry in accordance with various embodiments of the systems and methods described herein. Referring now to FIG. 5, a record page "J" 500 is illustrated. In various embodiments, after record page J 500 a record CRC 502 ("R_CRC") may be written. The record CRC may be a code based on the uncompressed bits of an entire record, for example, record J 500. If record J 500 is compressed, a block CRC 504 ("B CRC") might also be stored after the record 500. The block CRC may be a code based on the bits of an entire compressed record. One or more of these CRCs might be used to determine when a de-duplicate back-link to a record of data might be used.

A data block may include all data or, in some cases filler data 506 might be used to fill in any unused space between the page data and the page entry table. In various embodiments OxOO may be used as filler data 506 as illustrated in FIG. 5. For example, filler may occur when there is not enough room between the block CRC and the page entries to justify starting a new block. For example, in some embodiments, it might not be worth starting another block if less than three words are left. In such a case it might be better for the next block to be part of a subsequent group of records. Another example of when it might not be worth starting another block is when a flush operation forces a block to tape before it is completely full. In some embodiments, an EDC (error detection code) or CRC might be calculated over the entire block (including page data, filler, and page entry table) and be appended to the block following the page entry table 508.

Figure 6:
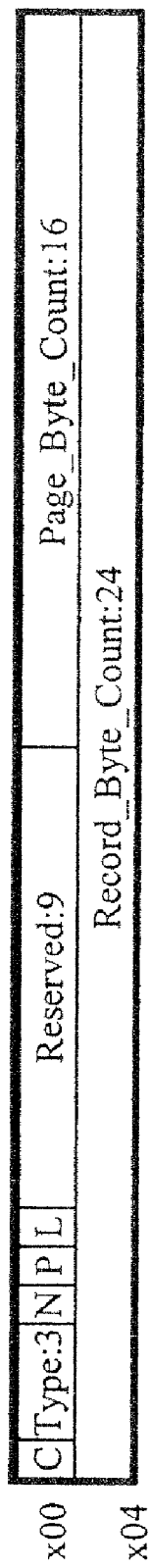
FIG. 6 is a diagram illustrating an example page entry definition in accordance with various embodiments of the systems and methods described herein.

FIG. 6 is a diagram illustrating an example page entry definition in accordance with various embodiments of the systems and methods described herein. Referring now to FIG. 6, the page entry definition may include reserved bits. These bits may allow for future modifications to the definition. In various embodiments these bits are set to O. The page entry definition may also include a compressed flag. When this bit is set it indicates that the record is compressed.

Additionally, the page entry definition may also include a record type. In various embodiments this is 3 bits and may indicate if the record is, for example, filler, record, or filemark. Bit "N" indicates that the record continues into the next block. Similarly, bit "P" indicates that the record continues from the previous block. Bit "L" indicates that this record is the last record and page entry in a block. Some embodiments might include a page byte count, which indicates the bytes of compressed data of the record in a page. (If the data is compressed.) The page entry definition may also include a record byte count that indicates the uncompressed length of the record.

Some of the example embodiments with respect to the figures are described here with reference to one or more tape drive back-up systems. It will be understood, however, that various systems and methods described herein may be used in conjunction with other storage devices and systems, including, for example, hard drives, flash drives, disk drives, etc.

Figure 7:
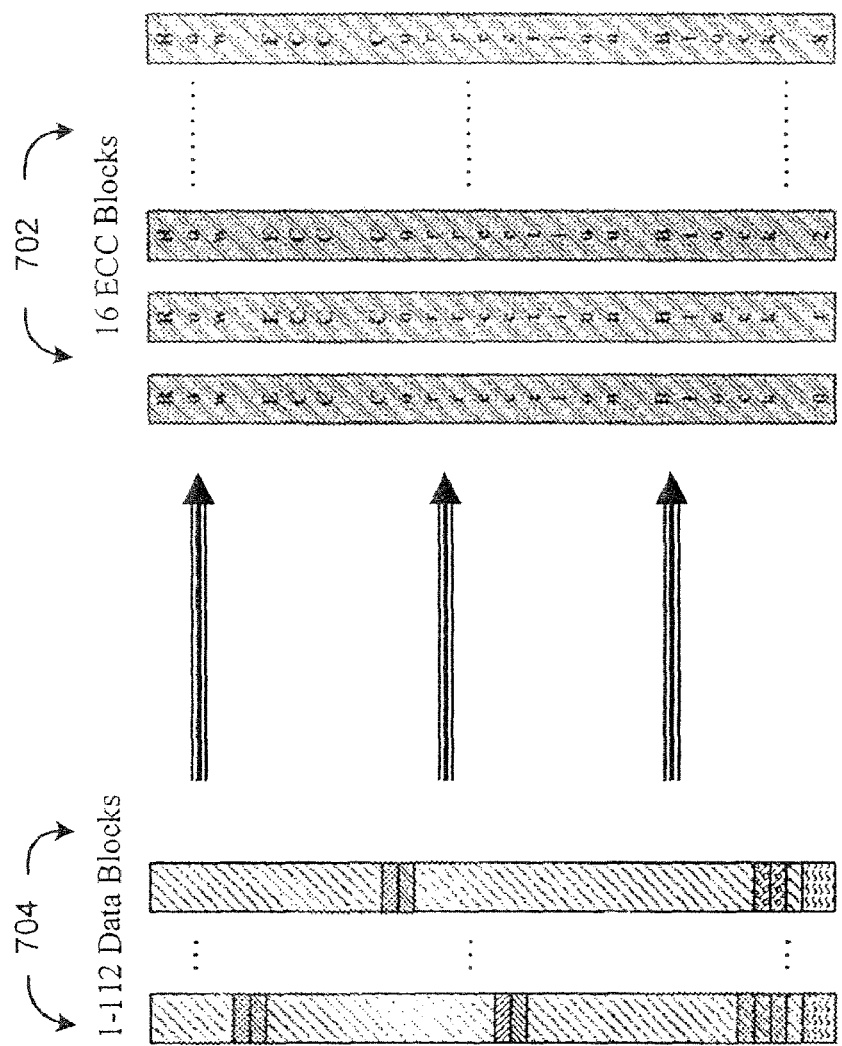
FIG. 7 is a diagram illustrating an example of error correction code block generation in accordance with various embodiments of the systems and methods described herein.

An outer error correction code may be generated for a set of consecutive blocks referred to as an entity. FIG. 7 is a diagram illustrating an example of entity ECC block generation in accordance with various embodiments of the systems and methods described herein. In various embodiments, outer correction code correction blocks 702 may be generated from the data blocks 704. For example, in various embodiments, 112 data blocks 704 might generate 16 error correction blocks 702. In various embodiments, the 112 data blocks 704 and 16 error correction blocks 702 may be formatted using a standard Reed-Solomon code. As illustrated in FIG. 7, the error correction code blocks 702 may immediately follow the last data block 704. In various embodiments there are no filler blocks between data 704 and error correction code 702. As discussed above, in various embodiments, each data block of the 112 data blocks 704 may also have an associated "inner error correction code." In various embodiments, the inner error correction code may also be appended to each outer ECC block before passing the block to the media access layer. Matches of outer ECC codes to those of preceding entities may allow de-duplicate back-links replacing whole entities of data.

Figure 8:
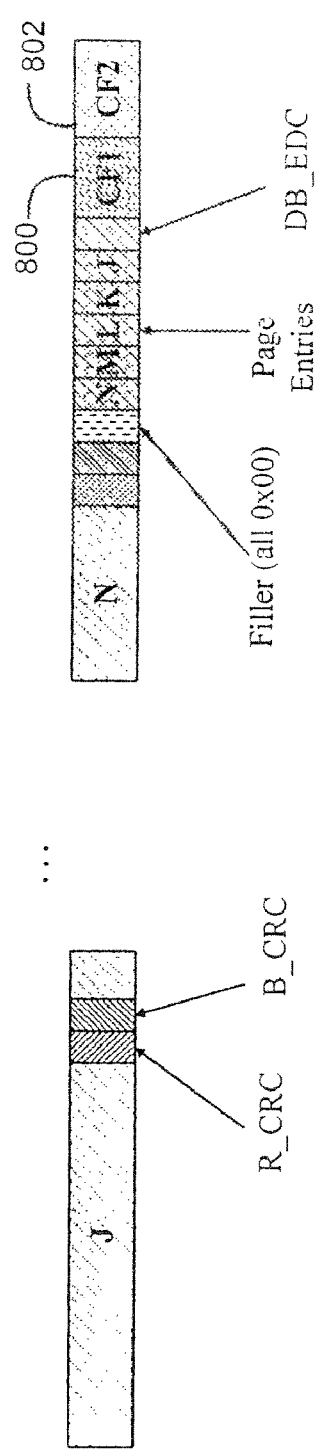
FIG. 8 is a diagram illustrating an example of page entry and control field in accordance with various embodiments of the systems and methods described herein.

FIG. 8 is a diagram illustrating an example of page entry and control fields in accordance with various embodiments of the systems and methods described herein. Referring now to FIG. 8, in various embodiments firmware may build a control field CF1 800 and CF2 802. The control fields may be written to the data block. For example, in various embodiments, the control fields may be written at the end of a 12288 byte data block, as illustrated in FIG. 8. An inner error correction code (or block level ECC 904) may be generated for each block independently, and written following the control field CF2 802. A matching inner error correction code may be used to determine when a de-duplicate backlink to a block of data might be used.

Figure 9:
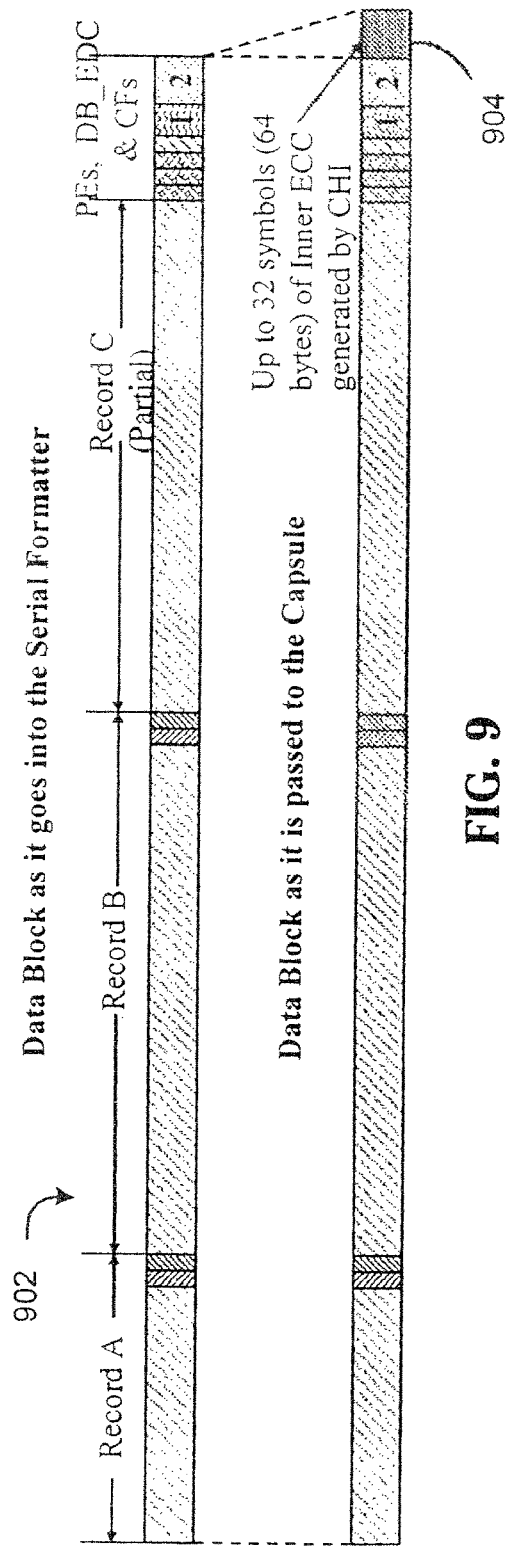
FIG. 9 is a diagram illustrating an example of write mode data block processing in accordance with various embodiments of the systems and methods described herein.

FIG. 9 is a diagram illustrating an example of write mode data block processing in accordance with various embodiments of the systems and methods described herein. As illustrated in FIG. 9, in some embodiments, a data block 902 may be processed by a serial formatter and passed to a capsule. When the data block is passed to the capsule it may, in some embodiments, include an inner error correction code 904. In various embodiments, a capsule might be a collection of physical blocks.

Figure 10:
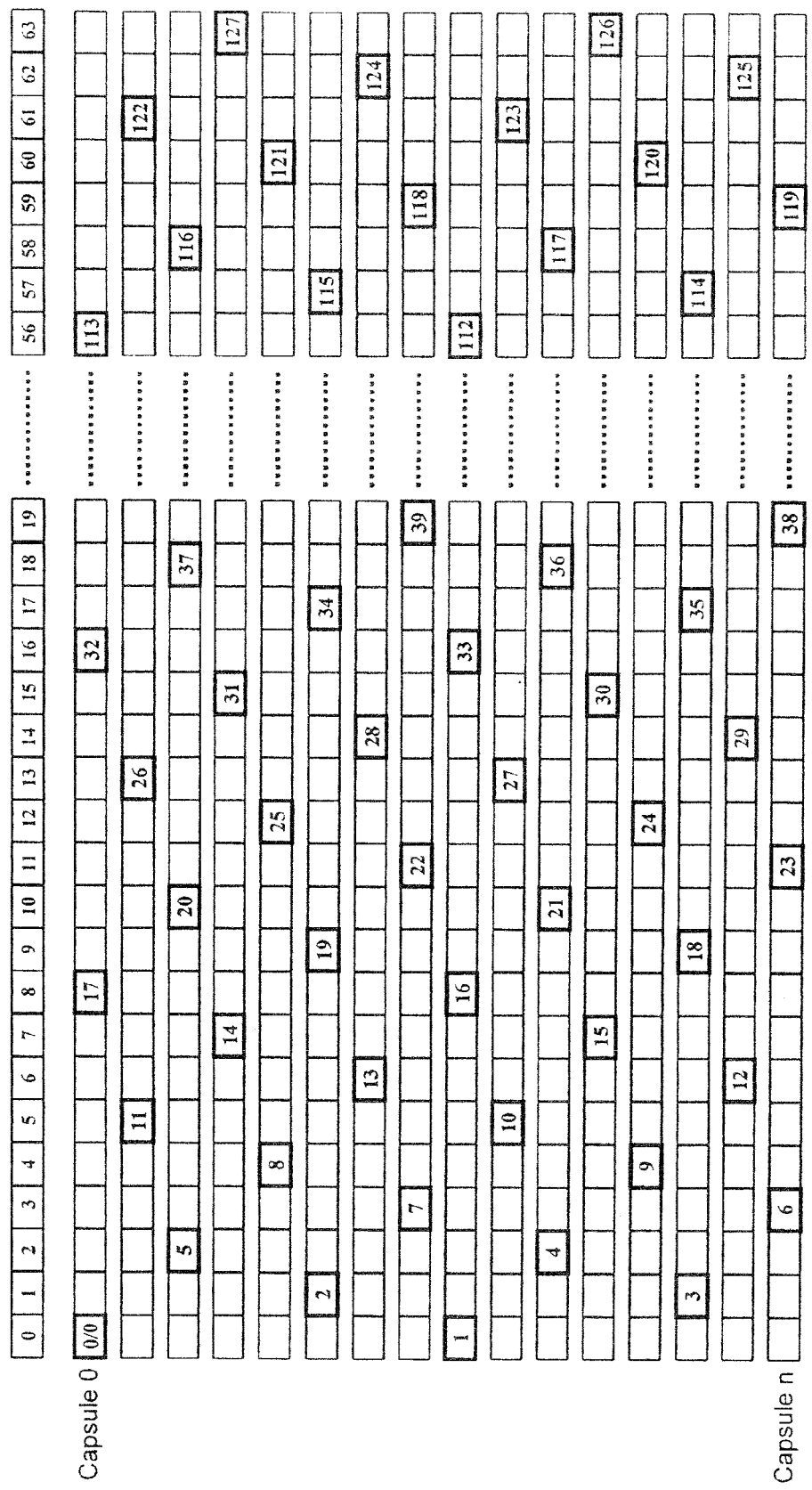
FIG. 10 is a diagram illustrating an example logical representation of a full size entity in cache in accordance with various embodiments of the systems and methods described herein.

FIG. 10 is a diagram illustrating an example of a vessel de-duplication process in accordance with various embodiments of the systems and methods described herein. Referring now to FIG. 10, capsules 0 to n are illustrated. The capsules may be a collection of physical blocks. Additionally, all blocks may be the same size. In various embodiments 8 entries may be included per capsule. Each entity may include 128 blocks. For example, in various embodiments the 128 blocks might include 112 data blocks and 16 error correction codes.

Various embodiments might include one vessel and the physical blocks might be the same size as the logical blocks. Accordingly, such embodiments might not use an offset because each logical block might be stored in a data storage device block. In other embodiments, the data storage device blocks might not be the same size as the logical blocks. Accordingly, in some embodiments, the starting point of a logical block might be stored as a data storage device block number and an offset from the beginning of the data storage device block. Additionally, the end of a block of data might also be stored as a block number and an offset. In some embodiments, data might be padded to fill a physical block, a logical block, or both.

Additionally, some systems might include one or more vessels. For example, the vessels may be disk drives, tape drives, or other data storage devices. Accordingly, a logical data block might be stored as a vessel number, physical block number, offset and a block count. In some embodiments, the block count may be the number of blocks for a given file, group of files, etc.

Figure 11:
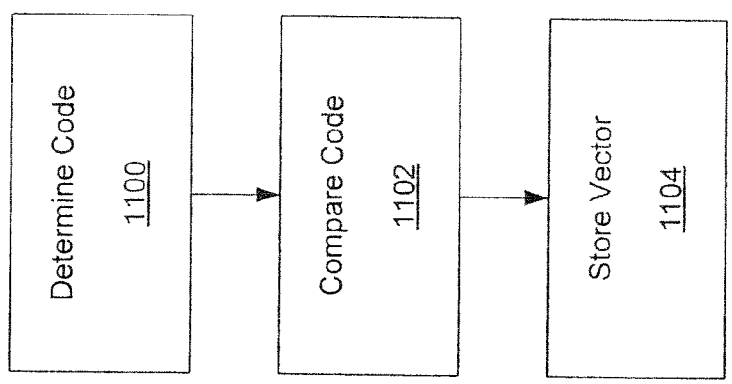
FIG. 11 is a flowchart illustrating an example method in accordance with various embodiments of the systems and methods described herein.

FIG. 11 is a flowchart illustrating an example method in accordance with some embodiments of the systems and methods described herein. Referring now to FIG. 11, in a step 1100 a code is determined. In various embodiments, the code may, for example, be determined using a hash function. The code might also be a eRe.

In some embodiments, a stream of data may be divided into blocks of data. A hashing or other function may then be used on each block of data to determine the code for that block of data. The code, for example, a hash, eRe, etc. may be used to identify the block of data. In this way blocks of data may be compared to each other to determine if any blocks of data match each other.

In some embodiments, the blocks of data may all be the same length. Generally, the smaller the blocks of data, the more likely it will be that blocks will match each other. The shorter the block length, however, the less data storage space that will be saved when a match occurs. As discussed above, the number of bits in a block should generally be larger than the number of bits in an address so that storing the address actually leads to a savings in storage space. If the address contains more bits than the block size more bits will be needed to store the address than to store the actual data.

In a step 1102 the code may be compared to other codes to determine if a block matches any other blocks. For example, in various embodiments, each time a code is determined for a block of data (step 1100) the code may be stored. Additionally, when a code is determined it may be compared to previously stored codes. When codes match this may indicate that the blocks of data match.

In some embodiments, additional steps may be taken to help avoid collisions. A collision may occur when a code matches but the data in the block does not actually match. For example, the blocks might be compared to each other bit-by-bit, word-by-word, etc. If the comparison determines that the blocks match then an address might be stored in place of the block in a step 1104.

In another embodiment, another code, such as a hash, CRC, etc. might be calculated for the blocks that are found to be a possible match. In other words, blocks that have matching codes may be compared using another code. The second code might be determined using a different method or a code containing more bits. This may decrease the probability of a collision because the longer code might have a lower probability of a false match.

Additionally, in some embodiments, the functions used to calculate the codes might be selected such that when both sets of codes indicate a match the blocks match exactly or have a very high probability of matching. A new code calculated for each block may be compared to determine if the blocks match or have a greater probability of matching. If the comparison determines that the blocks match, or probably match, then an address might be stored in place of the block in a step 1104.

In the step 1104, a vector that points to a block containing the data may be stored. In some embodiments, a counter might be used to determine addresses as a stream of data is received and processed. For example, assume that data blocks 0-5 are to be transmitted over a communications link, stored on a disk drive, tape drive, etc. If blocks 2 and 5 match, then, when block 5 is processed, the match will be determined because the code for block 2 should match the code for block 5. In place of block 5 an address, such as a vector to block 2 may be stored. If the address uses less data storage space than the block of data would, then the extra data storage space might be used to save other data.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that one embodiment be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more," or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and everyone of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Additionally, the embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method, comprising:
    comparing a de-duplication code for a first block of data received as part of an input stream, to a de-duplication code for a previously processed block of data;
    upon determining that the de-duplication code for the first block of data matches the code for the previously processed block of data, storing in an output stream a vector instead of the first block of data,
    where the vector points back in the output stream to one of, the previously processed block of data, or another vector,
    where the vector is placed in a location in the output data stream where the first block of data would have been placed,
    where the vector contains fewer bits than the first block of data, and
    where the vector does not contain the de-duplication code, and
    configuring the output stream to receive the next item to be stored at the end of the vector that was stored in the output stream, where the next item is to be processed from the input stream.

2. The method of claim 1, where the input stream can be recreated from the output stream without reference to an other de-duplication data structures.

3. The method of claim 1, where the output stream includes self-describing data.

4. The method of claim 1, where the stored block of data and the vector are stored in a non-tape solid state memory.

5. The method of claim 1, where the vector comprises a pointer to a previous physical block.

6. The method of claim 1, where the vector comprises a pointer to a previous logical block.

7. The method of claim 6, where the vector comprises a start address and an offset.

* * * * *